US009071315B2

(12) United States Patent
Huang et al.

(10) Patent No.: US 9,071,315 B2
(45) Date of Patent: Jun. 30, 2015

(54) INTERFERENCE SIGNAL DIVERSITY COMBINING FOR INTERFERENCE CANCELLATION

(71) Applicant: QUALCOMM Incorporated, San Diego, CA (US)

(72) Inventors: Yi Huang, San Diego, CA (US); Tao Luo, San Diego, CA (US); Wanshi Chen, San Diego, CA (US); Siddhartha Mallik, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 13/928,256

(22) Filed: Jun. 26, 2013

(65) Prior Publication Data

US 2014/0003479 A1 Jan. 2, 2014

Related U.S. Application Data

(60) Provisional application No. 61/666,680, filed on Jun. 29, 2012.

(51) Int. Cl.
| H04B 1/10 | (2006.01) |
| H04J 11/00 | (2006.01) |
| H04B 1/7107 | (2011.01) |
| H04B 7/04 | (2006.01) |

(52) U.S. Cl.
CPC ............ H04B 1/1027 (2013.01); H04B 1/7107 (2013.01); H04J 11/0036 (2013.01); H04J 11/0063 (2013.01); H04B 7/0413 (2013.01)

(58) Field of Classification Search
CPC .......... H04B 1/1027; H04B 1/10; H04B 1/71; H04W 52/243
USPC .................................. 375/229–236, 346–350
See application file for complete search history.

(56) References Cited

U.S. PATENT DOCUMENTS

| 7,280,585 | B2 | 10/2007 | Sriram et al. |
| 7,848,391 | B2 | 12/2010 | Shnaider et al. |
| 7,890,059 | B2 | 2/2011 | Heiman et al. |
| 8,036,325 | B2 | 10/2011 | Chitrapu et al. |
| 2004/0228426 | A1 | 11/2004 | Oh et al. |
| 2005/0276313 | A1 | 12/2005 | Horneman et al. |
| 2011/0064172 | A1* | 3/2011 | Olson et al. .................. 375/346 |

FOREIGN PATENT DOCUMENTS

EP 1971096 A2 9/2008

OTHER PUBLICATIONS

International Search Report and Written Opinion—PCT/US2013/048330—ISA/EPO—Oct. 15, 2013.

* cited by examiner

*Primary Examiner* — Curtis Odom
(74) *Attorney, Agent, or Firm* — Seyfarth Shaw LLP

(57) ABSTRACT

A method of wireless communication includes receiving a first interference signal and a second interference signal. The method further includes determining whether the second interference signal includes a different version of the first interference signal. Additionally, the method includes combining the first interference signal and the second interference signal to estimate an interference cancellation signal when the second interference signal is the different version of the first interference signal.

26 Claims, 14 Drawing Sheets

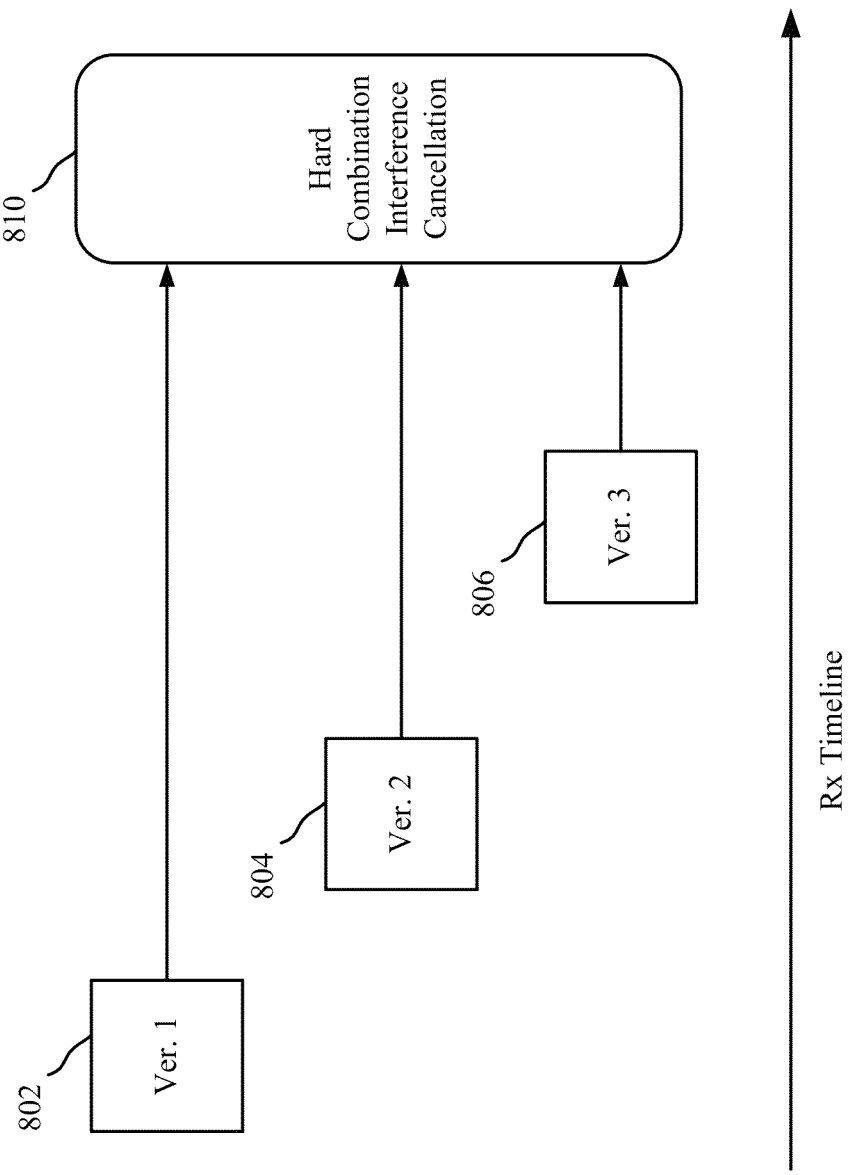

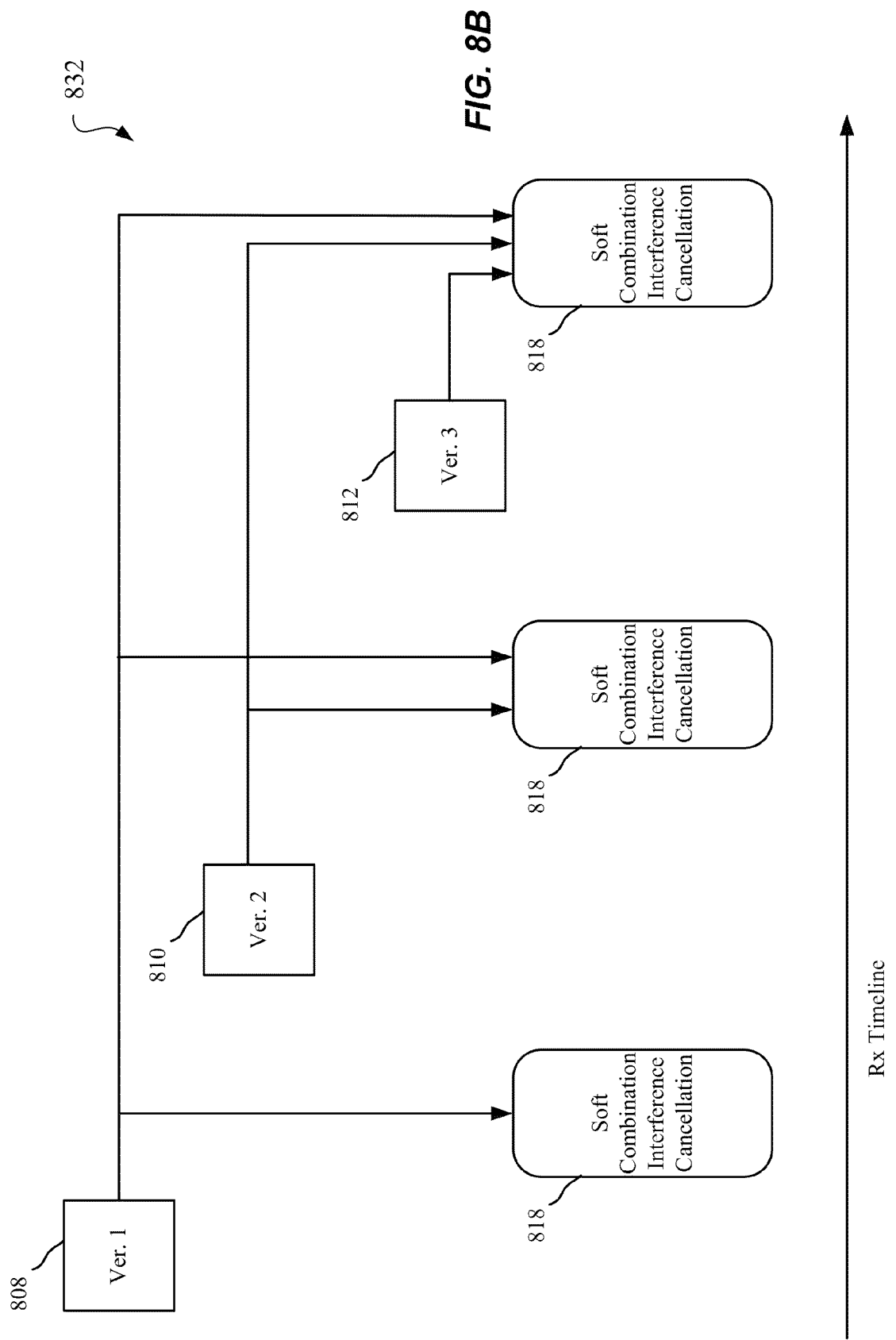

INTERFERENCE SIGNAL DIVERSITY COMBINING FOR INTERFERENCE CANCELLATION

CROSS-REFERENCE TO RELATED APPLICATION

This application claims the benefit under 35 U.S.C. §119(e) to U.S. Provisional Patent Application No. 61/666,680 entitled "COMBINING INTERFERENCE SIGNAL DIVERSITY FOR INTERFERENCE CANCELLATION," filed on Jun. 29, 2012, the disclosure of which is expressly incorporated by reference herein in its entirety.

BACKGROUND

1. Field

Aspects of the present disclosure relate generally to wireless communication systems, and more particularly to combining different versions of interference signals for interference cancellation.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

According to an aspect of the present disclosure, a method of wireless communication is disclosed. The method includes receiving a first interference signal at a receiver. The method also includes receiving a second interference signal at the receiver. The method further includes determining whether the second interference signal includes a different version of the first interference signal. The method still further includes combining the first interference signal and the second interference signal to estimate an interference cancellation signal when the second interference signal is the different version of the first interference signal.

Another aspect of the present disclosure is directed to an apparatus including means for receiving a first interference signal at a receiver. The apparatus also includes means for receiving a second interference signal at the receiver. The apparatus further includes means for determining whether the second interference signal includes a different version of the first interference signal. The apparatus still further includes means for combining the first interference signal and the second interference signal to estimate an interference cancellation signal when the second interference signal is the different version of the first interference signal.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of receiving a first interference signal at a receiver. The program code also causes the processor(s) to receive a second interference signal at the receiver. The program code further causes the processor(s) to determine whether the second interference signal includes a different version of the first interference signal. The program code still further causes the processor(s) to combine the first interference signal and the second interference signal to estimate an interference cancellation signal when the second interference signal is the different version of the first interference signal.

Another aspect discloses a wireless communication apparatus having a memory and at least one processor coupled to the memory. The processor(s) is configured to receive a first interference signal at a receiver. The processor(s) is also configured to receive a second interference signal at the receiver. The processor(s) is further configured to determine whether the second interference signal includes a different version of the first interference signal. The processor(s) is still further configured to combine the first interference signal and the second interference signal to estimate an interference cancellation signal when the second interference signal is the different version of the first interference signal.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 8A-8C show block diagrams of examples of combining diverse interference signals for interference cancellation according to an aspect of the present disclosure.

DETAILED DESCRIPTION

Figure 1:
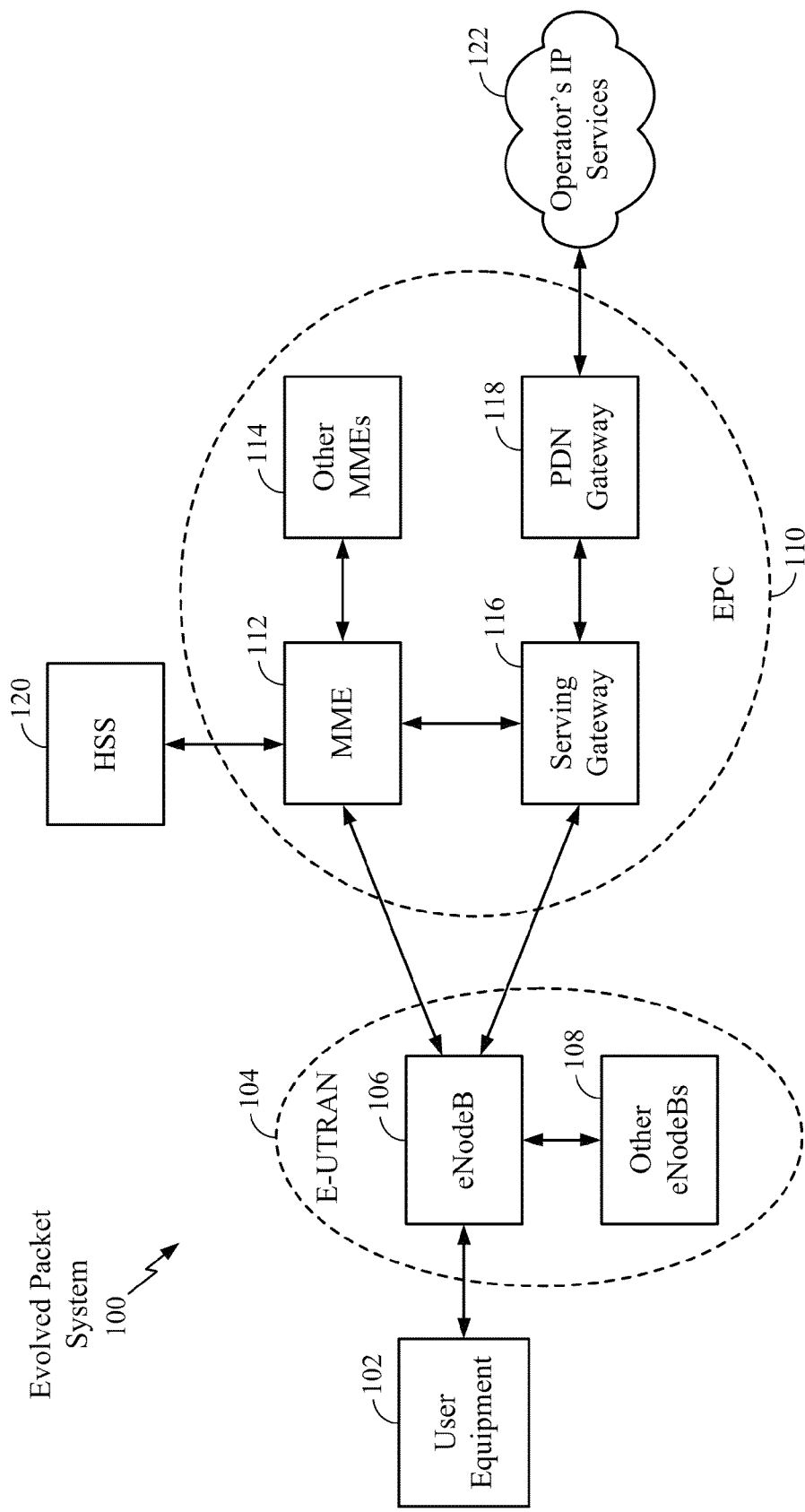
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
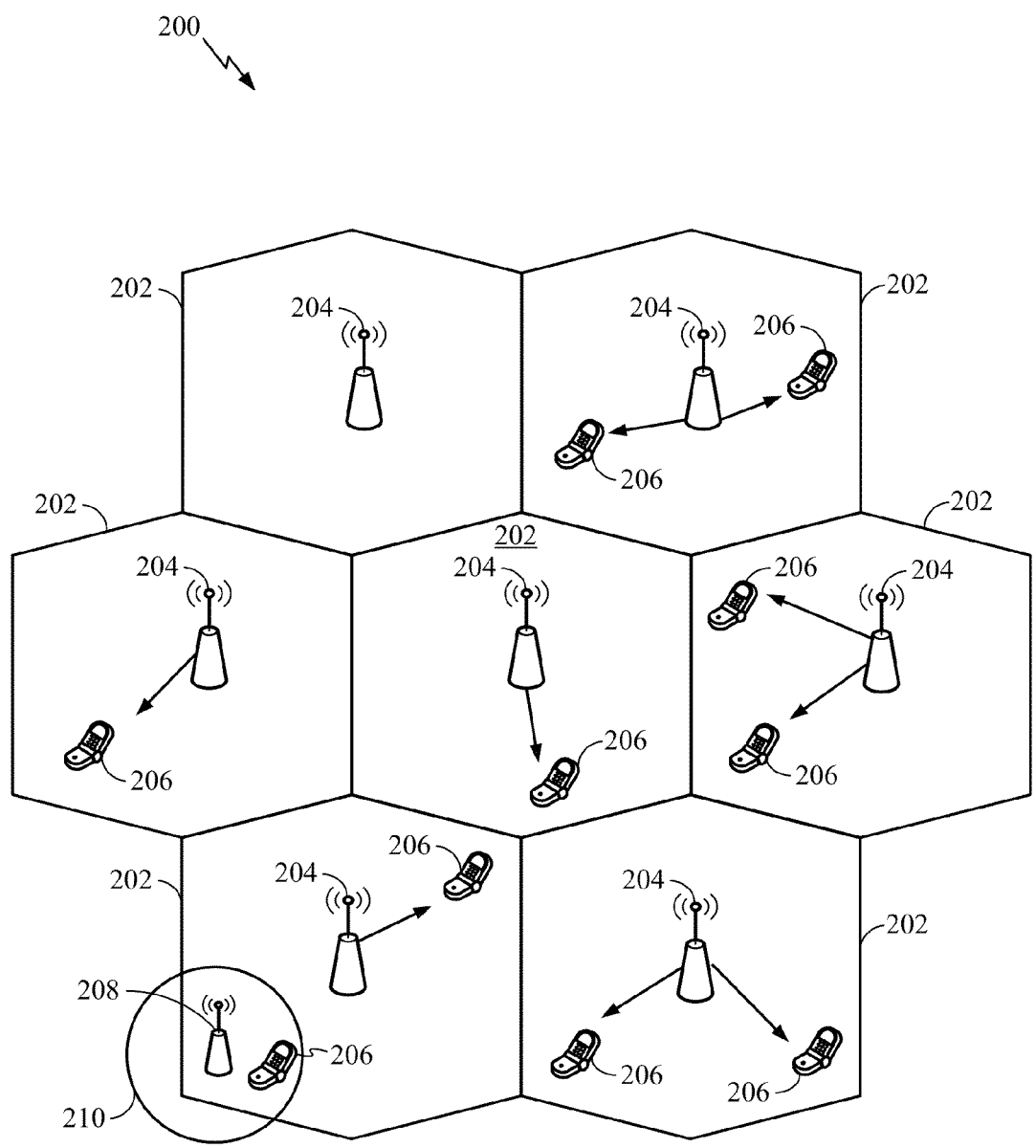
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
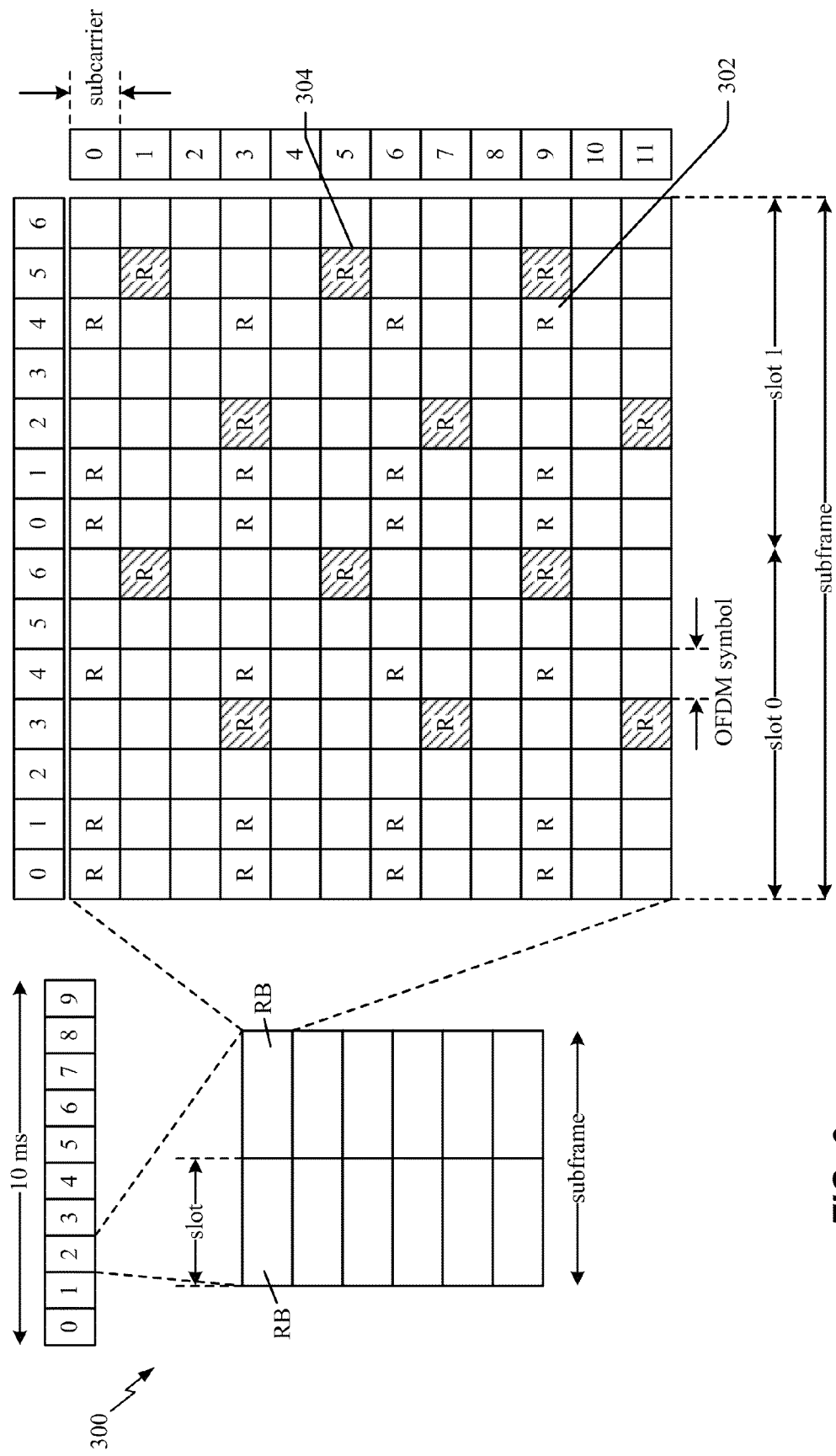
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
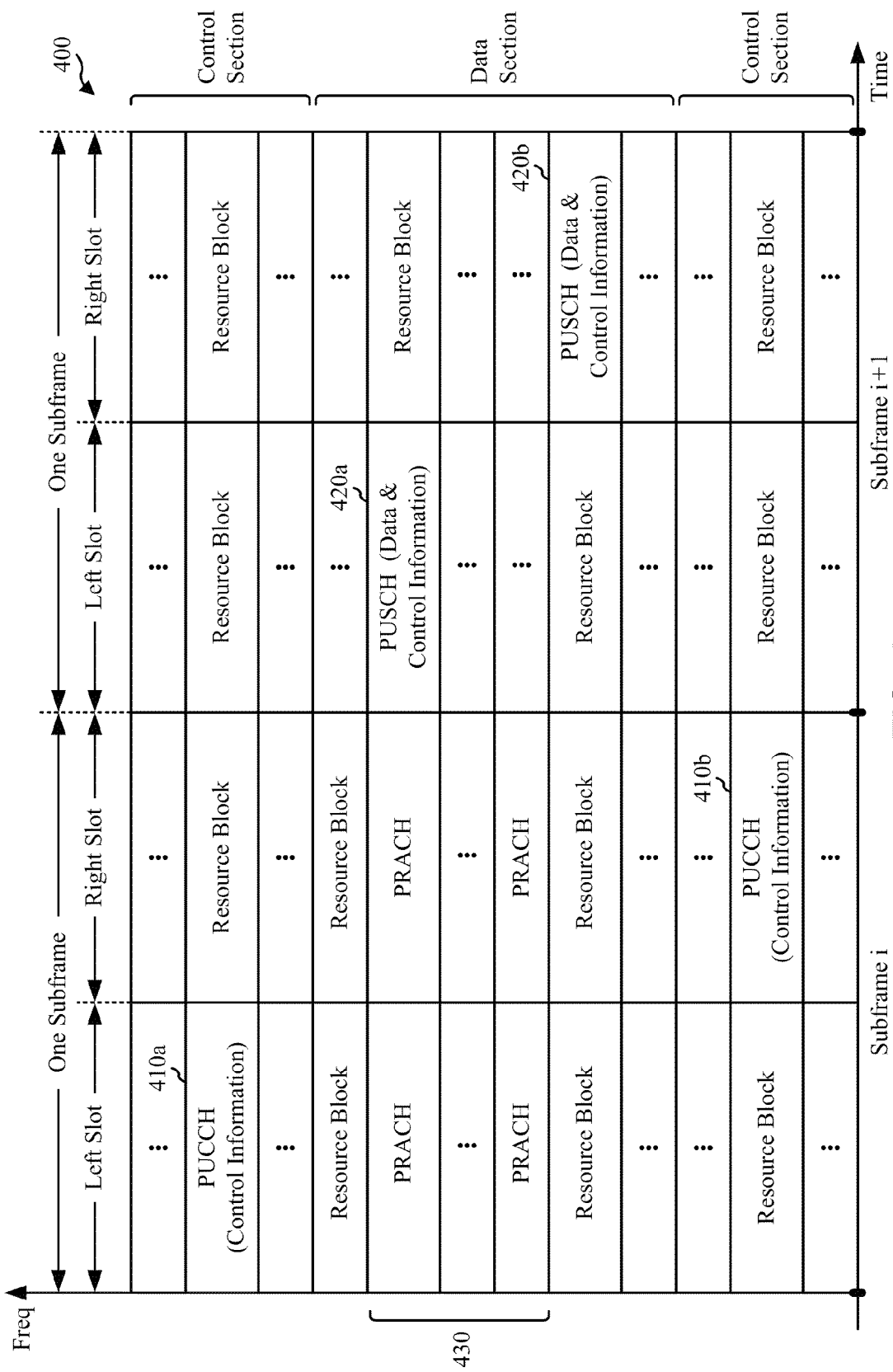
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
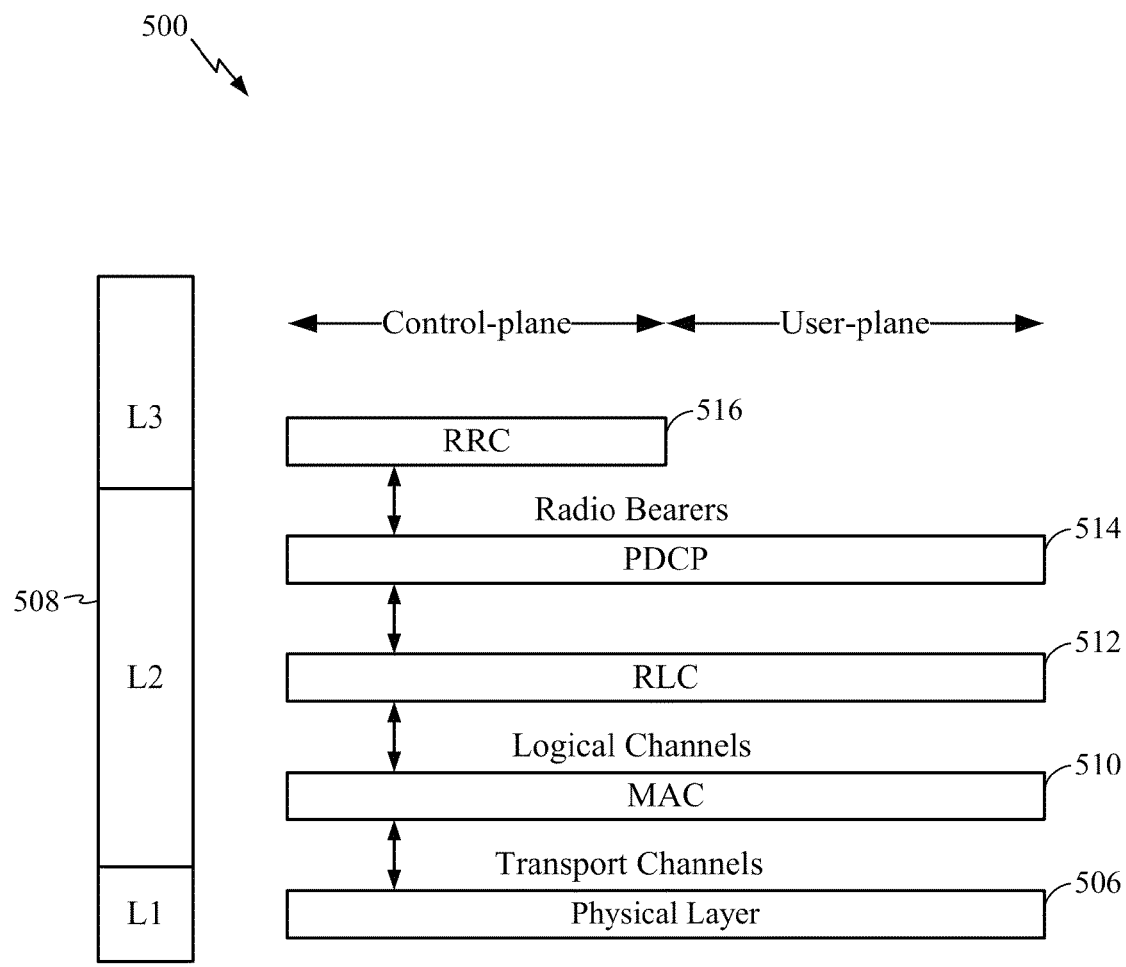
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
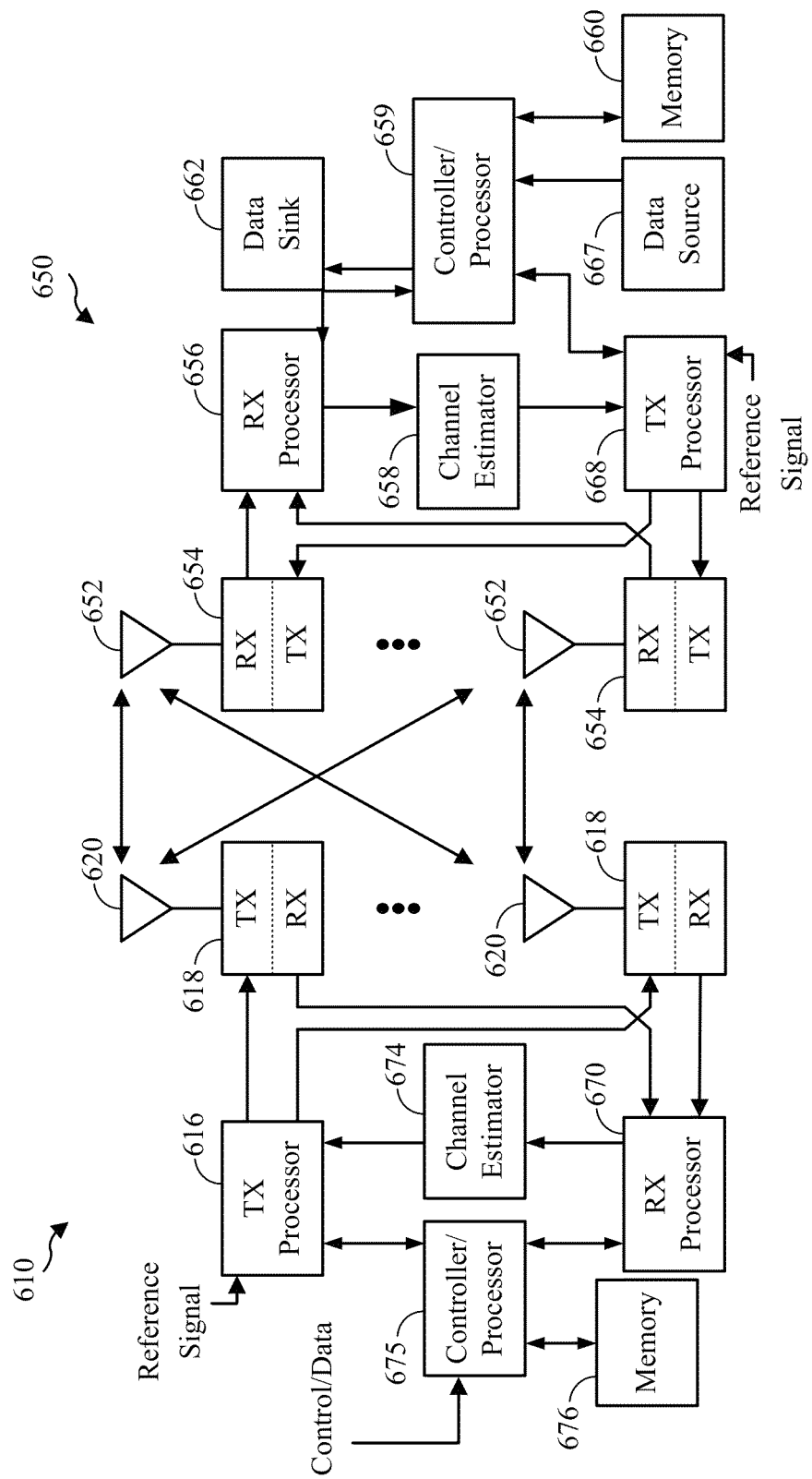
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Interference Cancellation

Multiple versions of the same data may be transmitted over multiple channels when transmission diversity is specified for data transmissions. For transmit diversity, each channel may be defined according to one or more partitions in a time domain (e.g., time slots or symbols), frequency domain (e.g., subcarriers). Specifically, transmission diversity may be achieved by transmitting the different versions of the data using different resource elements. For example, using the example frame structure 300 of FIG. 3, when transmission diversity is specified, the data may be transmitted using different resource elements of a frame 300.

Furthermore, transmission diversity may also be achieved by transmitting the different versions of the data using the same resource elements with different coding schemes, antennas, or transmission directions. When different versions of the data are transmitted using the same resource elements, a wireless device that receives an interference signal corresponding to certain resource elements in a frame may monitor other resource elements for different versions of the same interference signal. The wireless device may further monitor the same or different resource elements with respect to other coded or directional channels for different versions of the interference signal. According to an aspect of the present disclosure, when the wireless device determines that transmission diversity is used for the interference signal, the wireless device may combine two or more of the received versions of the interference signal to estimate and cancel the interference signal. The wireless device may be a UE, an eNodeB, or any other type of receiver.

Figure 7A:
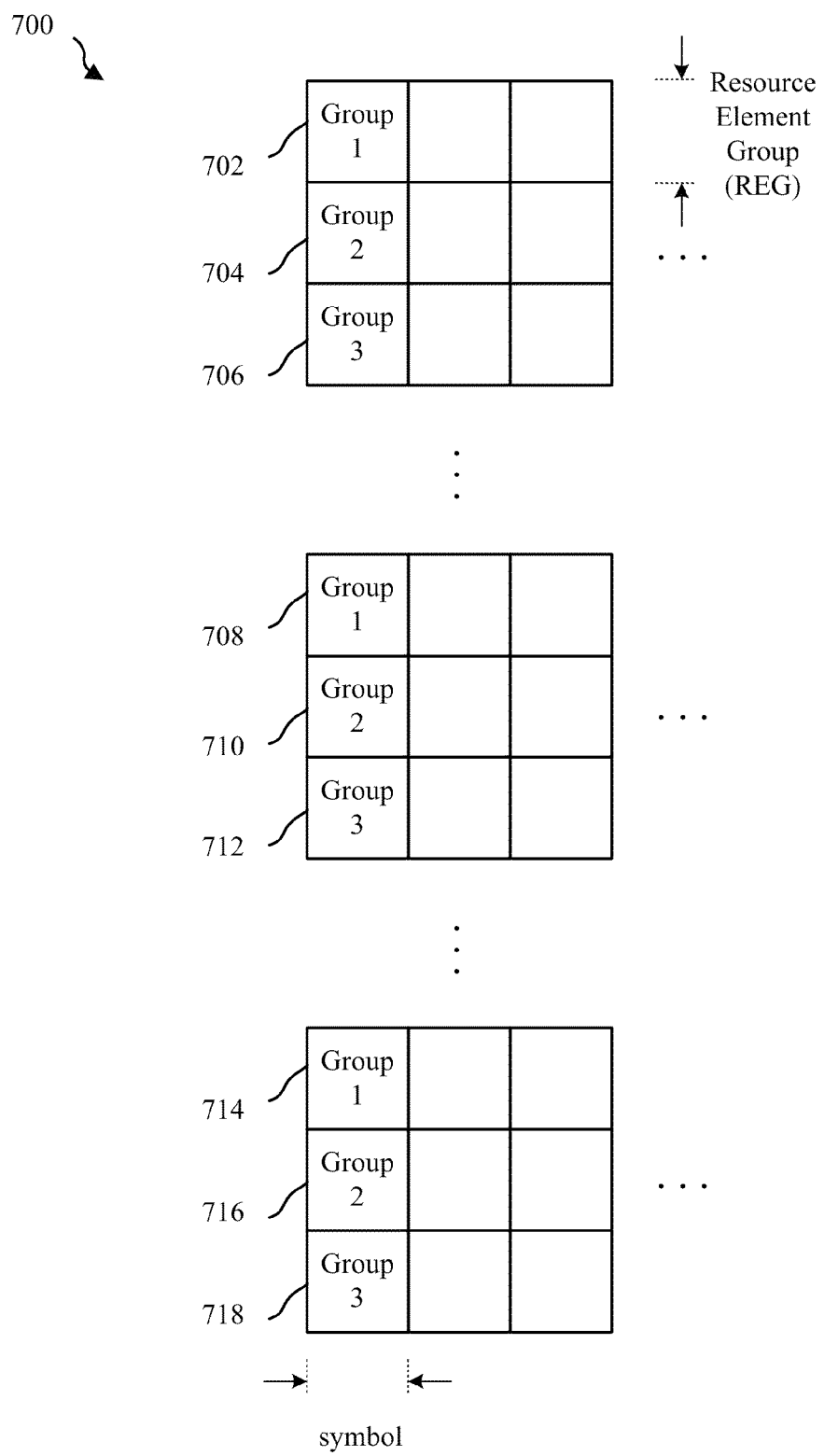
FIGS. 7A and 7B show block diagrams of exemplary transmission diversity in a received interference signal according to an aspect of the present disclosure.
Figure 7B:
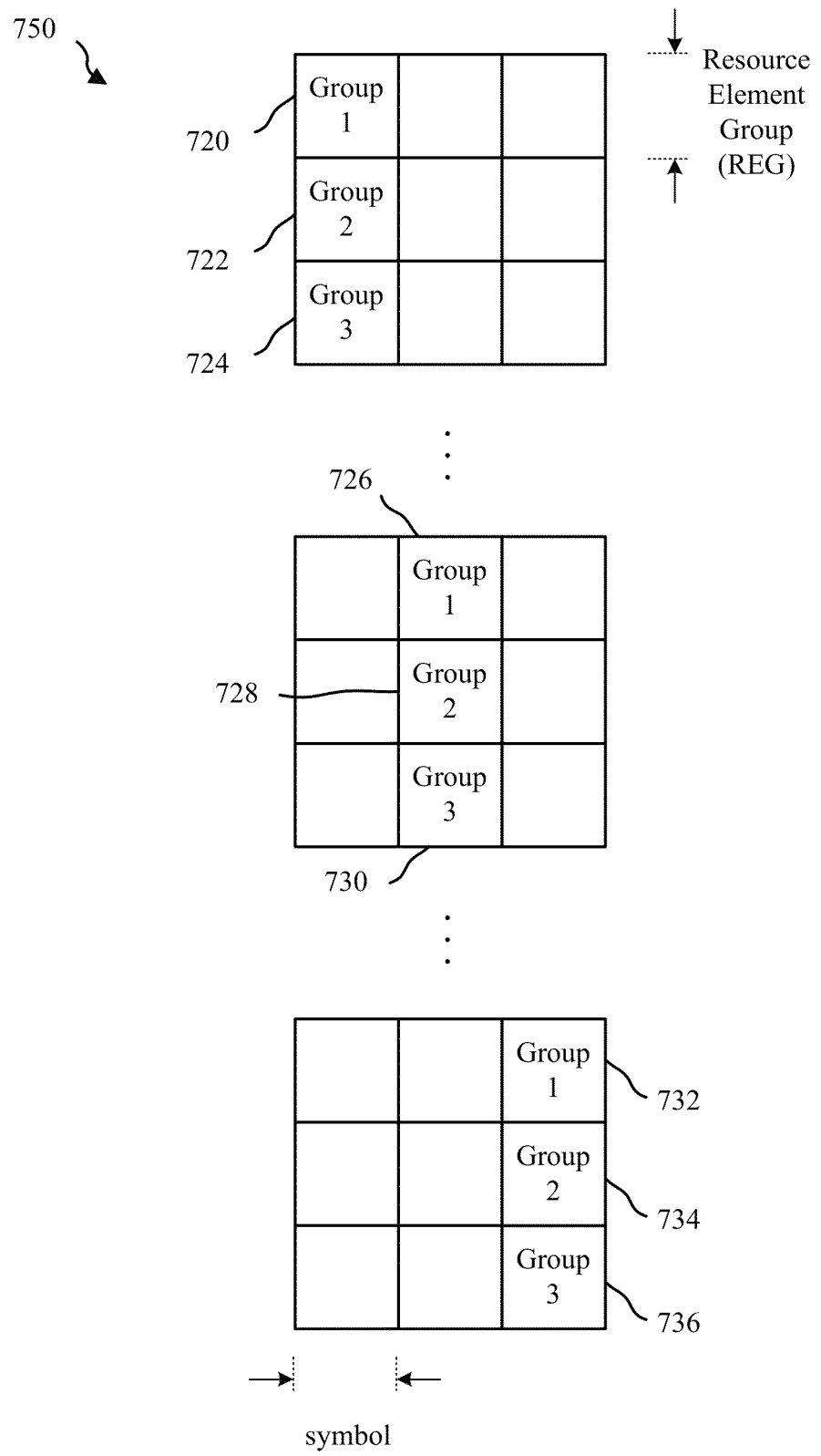

FIGS. 7A and 7B are block diagrams showing examples of transmission diversity for a channel, such as a physical hybrid-ARQ indicator channel (PHICH). FIG. 7A illustrates a portion of a frame 700 that may be received at a UE or base station. The frame 700 may be similar to the frame structure 300 described in the example of FIG. 3. The symbols of FIGS. 7A and 7B may be OFDM symbols.

As illustrated in FIG. 7A, a signal may be transmitted in the same symbol with different versions in different resource element groups. The transmission diversity of FIG. 7A may be referred to as normal duration transmission diversity. As shown in FIG. 7A, each group (Group 1, Group 2, and Group 3) is associated with a specific signal within a different resource element group. That is, each group is associated with a specific signal and different versions of the same signal are transmitted in each resource element group.

As shown in FIG. 7A, a first signal may be received in different resource elements groups 702, 708, and 714 of a first group (Group 1). Specifically, each resource element group 702, 708, and 714 of the first group has a different version of the first signal. Moreover, a second signal may be received in different resource elements groups 704, 710, and 716 of a second group (Group 2). Furthermore, a third signal may be received in different resource elements groups 706, 712, and 718 of a third group (Group 3).

As illustrated in FIG. 7B, a signal may transmitted in different symbol periods and also in different resource element groups. The transmission diversity of FIG. 7B may be referred to as an extended duration transmission diversity 750. As shown in FIG. 7B, each group (Group 1, Group 2, and Group 3) is associated with a specific signal that is transmitted in different resource element group. That is, each group is associated with a specific signal and different versions of the signal are transmitted in each resource element group.

As shown in FIG. 7B, a first signal may be received in different resource element groups 720, 726, and 732 of a first group (Group 1). Each version in group 1 is received in a different symbol period. The different resource element groups 720, 726, and 732 include different versions of the first signal. Moreover, a second signal may be received in different resource elements groups 722, 728, and 734 of a second group (Group 2). Each version in group 2 is received in a different symbol period. Furthermore, a third signal may be received in different resource elements groups 724, 730, and 736 of a third group (Group 3). Each version in group 3 is received in a different symbol period.

In the normal duration transmission diversity and extended duration transmission diversity, different versions of an interference signal may be received in different resource element groups. Each version of the interference signal may be received at the same symbol period in different resource element groups or on different symbol periods and different resource element group. In one configuration, the wireless device may compare the versions of the interference signals to determine whether the interference signals are different versions of each other. Based on that determination, the wireless device may combine two or more of the interference signals to cancel the interference associated with signals of a specific group (e.g., Group 1, Group 2, or Group 3).

As an example, with reference to FIG. 7B, different versions of an interference signal may be received at different points in time. Thus, a first version of an interference signal associated with Group 1 may be received during a first symbol period at a first reference element group 720. Additionally, a second version of an interference signal may be received during a second symbol period at a second reference element group 726. Furthermore, a third version of an interference signal may be received during a third symbol period at a third reference element group 732.

In this example, each version of an interference signal may be received during different symbol periods with each version of a group received in a different reference element group. In some cases, the different versions of an interference signal may be received at the same symbol period based on a normal duration transmission diversity scheme. In other cases, the different versions of an interference signal may be received at different points in time due to signal or channel conditions. Still, in other cases, the different versions of an interference signal may be received substantially concurrently and processed according to a certain order (e.g., in-order processing or out-of-order processing). Thus, the wireless device may compare incoming interference signals with previously received interference signals to determine whether later received interference signals are versions of the first interference signal. Based on that determination, the wireless device may combine the different versions of an interference signal to cancel one or more of the received interference signals.

While the examples of FIG. 7A and FIG. 7B have been explained with respect to the diversification of received interference signals in the time and frequency domains, those having skill in the art will comprehend that additional or alternative diversification in the coding or direction (e.g., beam forming) domains may be present in interference signals received at a UE or base station.

Furthermore, the foregoing description of FIG. 7A and FIG. 7B set forth the example of a wireless device identifying the use of transmission diversity in received interference signals by comparing the received interference signals with each other. Nevertheless, the present description contemplates additional or alternative aspects in which the wireless device uses additional or alternative methods to identify the use of transmission diversity in interference signals. In certain examples, the source of the interference may transmit a signal indicating the use of transmission diversity and how an interference signal is diversified across various domains. This signal may be directly intended for the wireless device from the interference source. Additionally or alternatively, the wireless device may listen to communications between the interference source and an intended recipient of the interference signals to identify the use of transmission diversity by the source of the interference.

In a conventional transmit diversity interference cancellation scheme, each version of an interference signal is used separately to estimate the signal for the interference cancellation. That is, in a conventional transmit diversity interference cancellation scheme, the different versions of an interference signal are not combined to make a joint estimation for interference cancellation. To improve the interference cancellation, aspects of the present disclosure specify combining the different versions of an interference symbol for joint estimation for interference cancellation.

In one example, the versions of the interference symbol may be determined based on the location of resource element groups of an interfering PHICH channel. That is, each resource element group transmits a different version of the same PHICH. The location of the different resource element groups may be determined by decoding an interfering physical broadcast channel to determine whether the PHICH is a normal PHICH or an extended PHICH. In this example, the location of the resource element groups may be determined based on whether the PHICH is a normal or extended PHICH and the interfering cell ID. Accordingly, the versions may be determined based on the resource element groups.

Figure 8C:
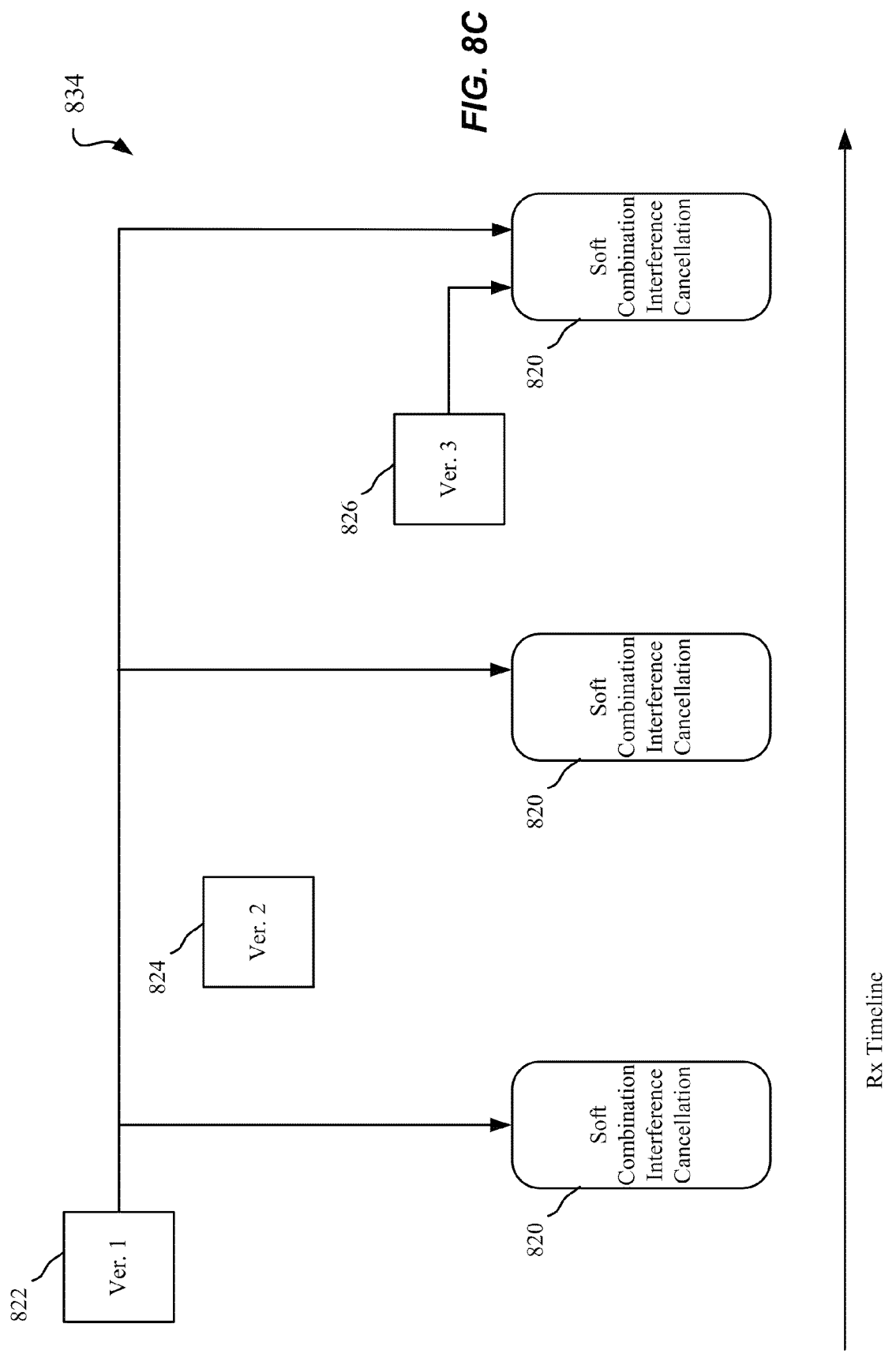

FIGS. 8A-8C are block diagrams of exemplary interference signal estimation and cancellation in a wireless device according to a transmission diversity scheme specified by an interference source. In each of these examples, the reception of each version of the interference signal is shown with respect to a reception (Rx) timeline. The reception timeline may indicate the timing according to when the different versions of the interference signal are received at a wireless device. Alternatively, the reception timeline may reflect the order in which received versions of the interference signal are processed for interference cancellation.

In one configuration, each version of the interference signal may be received on different channels. The channels may be distinguishable based on various factors. In one configuration each channel is associated with a different time slot, a different frequency, a different antenna port of the receiver, a different coding, or a combination thereof.

As shown in FIG. 8A, in one configuration, a wireless device may perform a hard combination 830 of different versions of an interference signal to estimate and cancel the interference. The wireless device may receive a first version 802 of an interference signal at a first time, a second version 804 of the interference signal at a second time, and a third version 806 of the interference signal at a third time. Alternatively, each version 802-806 may be received at the same time, and the versions 802-806 may be processed in a specific order, such as the order shown in FIG. 8A. In this configuration, hard combination interference cancellation 810 is specified to combine all received versions 802-806 of the interference signal to estimate the interference signal and generate an interference cancellation signal. The interference cancellation signal may be used to cancel each received version 802-806 of the interference signal. That is, the hard combination interference cancellation of the present configuration waits until all versions of an interference signal are received before combining the interference signals to make a joint estimation for the interference cancellation.

As shown in FIG. 8B, in another configuration, a UE or base station may perform a soft combination 832 of different versions 808-812 of an interference signal to estimate and cancel the interference. Similar to the configuration of FIG. 8A, the wireless device may receive or process a first version 808 of an interference signal at a first time, a second version 810 of the interference signal at a second time, and a third version 812 of the interference signal at a third time.

In this configuration, when the first version 808 of the interference signal is received or processed, a soft combination interference cancellation function 818 may estimate an interference cancellation signal for the first version 808 based only on the measurement of the first version 808. Additionally, when the second version 810 is received or processed, the soft combination interference cancellation function 818 may estimate an interference cancellation signal for the second version 810 based on a combination of the first version 808 and the second version 810. In one configuration, the combination may be weighted according to signal-to-noise ratios (SNRs) of the versions 808-812 or other criteria.

Furthermore, when the third version 812 is received or processed, the soft combination interference cancellation function 818 may estimate an interference cancellation for the third version 812 based on a combination of the first version 808, the second version 810, and the third version 812. Thus, as each version 808 is received, the soft combination interference cancellation function 818 may estimate an interference cancellation signal based on a combination of all versions of the interference signal that have been received or processed up to that point. In this aspect, the estimation of the interference cancellation signal progressively improves over time with each combination. The soft combination interference cancellation functions 818 may be performed by the same processor or module implemented by a processor.

As shown in FIG. 8C, in yet another configuration, a UE or base station may perform a partial soft combination 834 of different received versions 822-826 of an interference signal to estimate and cancel the interference. Similar to FIGS. 8A and 8B, the UE or base station may receive or process a first version 822 of an interference signal at a first time, a second version 824 of the interference signal at a second time, and a third version 826 of the interference signal at a third time. When the first version 822 of the interference signal is received or processed, a soft combination interference cancellation function 820 may estimate an interference cancellation signal for the first version 822 based only on the measurement of the first version 822.

Additionally, in this configuration, when the second version 824 of the interference signal is received or processed, the UE or base station may determine that the SNR or another measure of quality for the second version 824 is below a threshold. Thus, the UE or base station may disregard the received second version 824 and the soft combination interference cancellation function 820 may estimate an interference cancellation signal for the second version based on the previously received or processed first version 822. Furthermore, when the third version 826 of the interference signal is received or processed, the soft combination interference cancellation function 820 may estimate an interference cancellation signal for the third version 826 based on the first version 822 and the third version 826. In this configuration, because the second version 824 was not used for the previous interference cancellation, the second version 824 is not used when combining the first version 822 and the third version 826.

In another configuration, instead of entirely disregarding the second version 824, the soft combination interference cancellation function 818 may weigh the second version 824 less than the first version 822 and the third version 826 when combining the versions 808 to estimate the interference cancellation signals. In some cases, each combination by an interference cancellation function 810, 818, 820 may be weighted according to signal quality or other criteria.

According to an aspect of the present disclosure, different combining options may be selected for different scenarios. In one configuration, the combining may be based on a diversity type of an interfering cell. In another configuration, the combining may be based on a reception power budget and/or reception timeline requirements. For example, in some cases, only two out of three versions of the interference signal may be combined because there may not be enough power to combine three versions. In another example, the combining of versions may be limited based on a serving cell timeline or a HARQ timeline.

In one example, the UE may be configured to decode a serving cell's PHICH before a specific time. In this example, if the UE receives three versions of the interference signal, the UE may only combine two of the three versions of the interference signal if the third version is received after the specific time that is configured for decoding the serving cell's PHICH.

Figure 9:
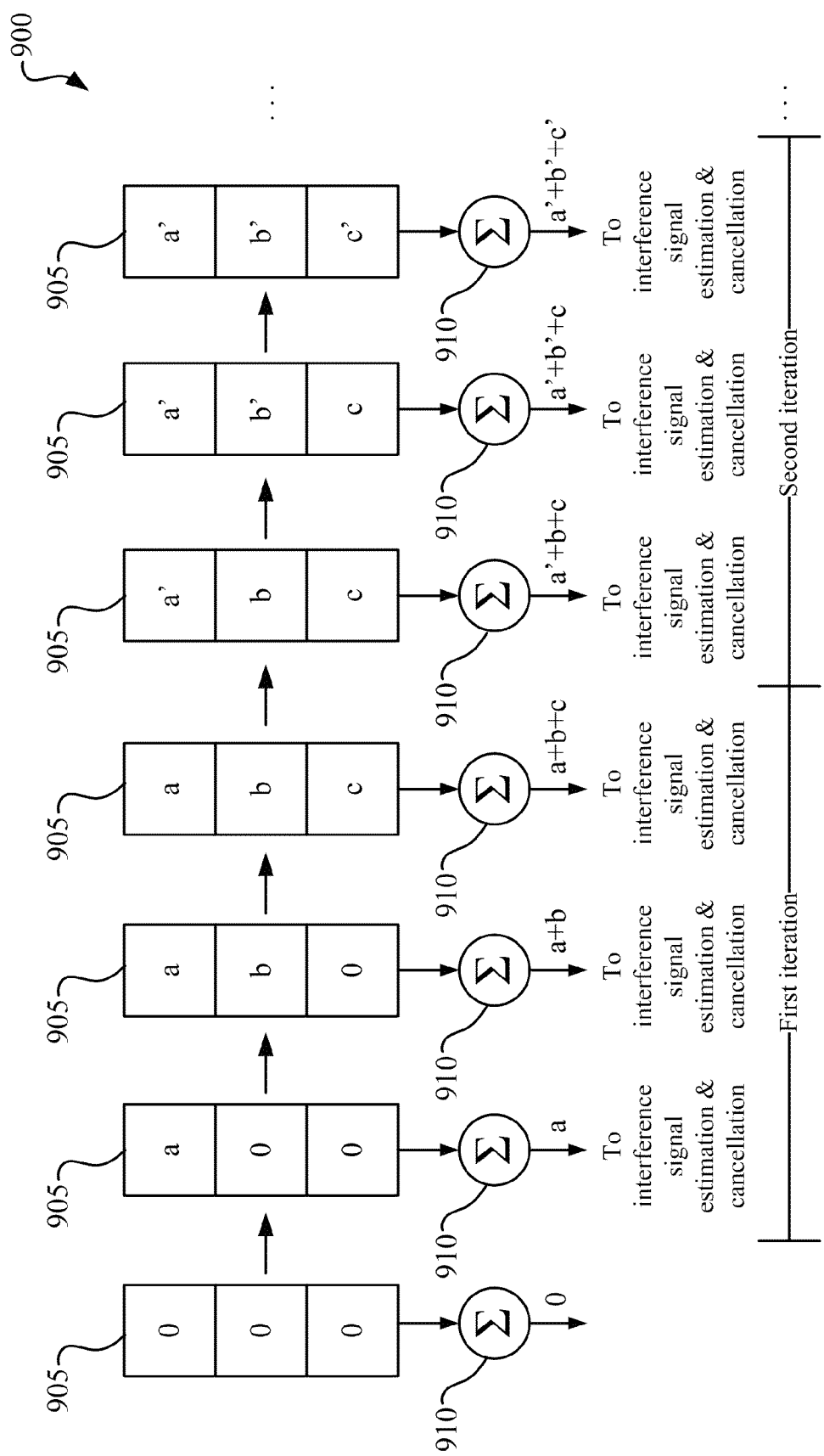
FIG. 9 shows a block diagram of an example of a process of iteratively combining diverse interference signals for interference cancellation according to an aspect of the present disclosure.

FIG. 9 is a block diagram of an example iterative process 900 that may be performed by a UE, base station, or other wireless device receiving interference signals according to a transmission diversity scheme based on aspects of the present disclosure. Specifically, FIG. 9 shows a buffer 905 at different points in time during a process 900. The buffer 905 may store a predetermined number of elements. In the present example, the buffer 905 stores three elements for the purpose of illustration. Nevertheless, it will be apparent to those having ordinary skill in the art that the buffer 905 may store any desired number of elements.

The buffer may be communicatively coupled with a summing block 910 configured to sum the elements in the buffer 905 for output to an interference signal estimation/cancellation module in the wireless device. That is, the output of the summing block 910 may be used to perform hard or soft combination interference estimation and cancellation as described above with respect to FIGS. 8A-8C. The elements stored in the buffer may be measurements of received or processed versions of interference signals. In one configuration, the measurements are the logarithm of the likelihood ratio (LLR) of the interference signal and/or an estimated mean of the interference signal.

As shown in FIG. 9, at a first stage, the buffer 905 may be initialized for each element to store a null value, such as 0. At a second stage, the wireless device may store a first measurement "a" for a first received or processed version of an interference signal in a first position of the buffer. As shown in FIG. 9, the output of the summing block 910 at the second stage is the first measurement "a." The output may be used to estimate a first interference cancellation signal, which may be applied to the first version of the interference signal.

At a third stage, the wireless device may store a second measurement "b" for a second received or processed version of the interference signal in a second position of the buffer 905. At the third stage, the output of the summing block 910 is the sum of the first measurement and the second measurement "a+b." The output of the third stage may be used to estimate a second interference cancellation signal which may be applied to the second version of the interference signal.

At a fourth stage, the wireless device may store a third measurement "c" for a third received or processed version of the interference signal in a third position of the buffer 905. The output of the fourth stage is the sum of the first measurement, second measurement, and third measurement "a+b+c." The output of the fourth stage may be used by the interference signal estimation and cancellation functions to estimate a third interference cancellation signal which may be applied to the third version of the interference signal. In another configuration, when a hard combination is specified, the output of the fourth stage may be used to estimate the interference cancellation signal for the hard combination.

After the fourth stage, a first iteration may be complete and a second iteration may be initiated. In the second iteration, at a fifth stage, a fifth measurement "a" for the first version of the interference signal may replace the first measurement "a" in the first position of the buffer 905. Thus, a fourth interference cancellation signal based on the sum of the fifth measurement, second measurement, and third measurement "a'+b+c" may be estimated.

At a sixth stage, a sixth measurement "b'" for the second version of the interference signal may replace the second measurement "b" in the second position of the buffer 905. In one configuration, the sixth measurement "b'" replaces the second measurement in the second position after application of the second interference cancellation signal. Thus, a fifth interference cancellation signal is based on a sum of the fifth measurement, sixth measurement, and third measurement "a'+b'+c."

At a seventh stage, a seventh measurement "c'" for the third version of the interference signal may replace the third measurement "c" in the third position of the buffer 905. In one configuration, the seventh measurement "c'" replaces the measurement in the third position after application of the third interference cancellation signal. Thus, a sixth interference cancellation signal is based on a sum of the fifth measurement, sixth measurement, and seventh measurement "a'+b'+c'."

The aforementioned process may continue for a predetermined number of iterations or until a stopping criterion is met. In some cases, the wireless device may select a number of iterations based on a power budget, a processing budget, time constraints, or other factors. With successive iterations of interference cancellation, the removal of interference signal from the data may improve.

It should be understood that in certain examples, the partial combination may be specified for the iterative combining. For example, the summing block 910 may be configured to weigh positions in the buffer 905 when creating the sum. The weight may be based on a measured channel quality, signal quality, or another criterion indicative of signal integrity associated with the version of the interference signal stored in the specific position of the buffer 905. In one configuration, the summing block 910 may disregard one or more positions in the buffer 905 based on channel quality, signal quality, or another measure of signal integrity.

Figure 10:
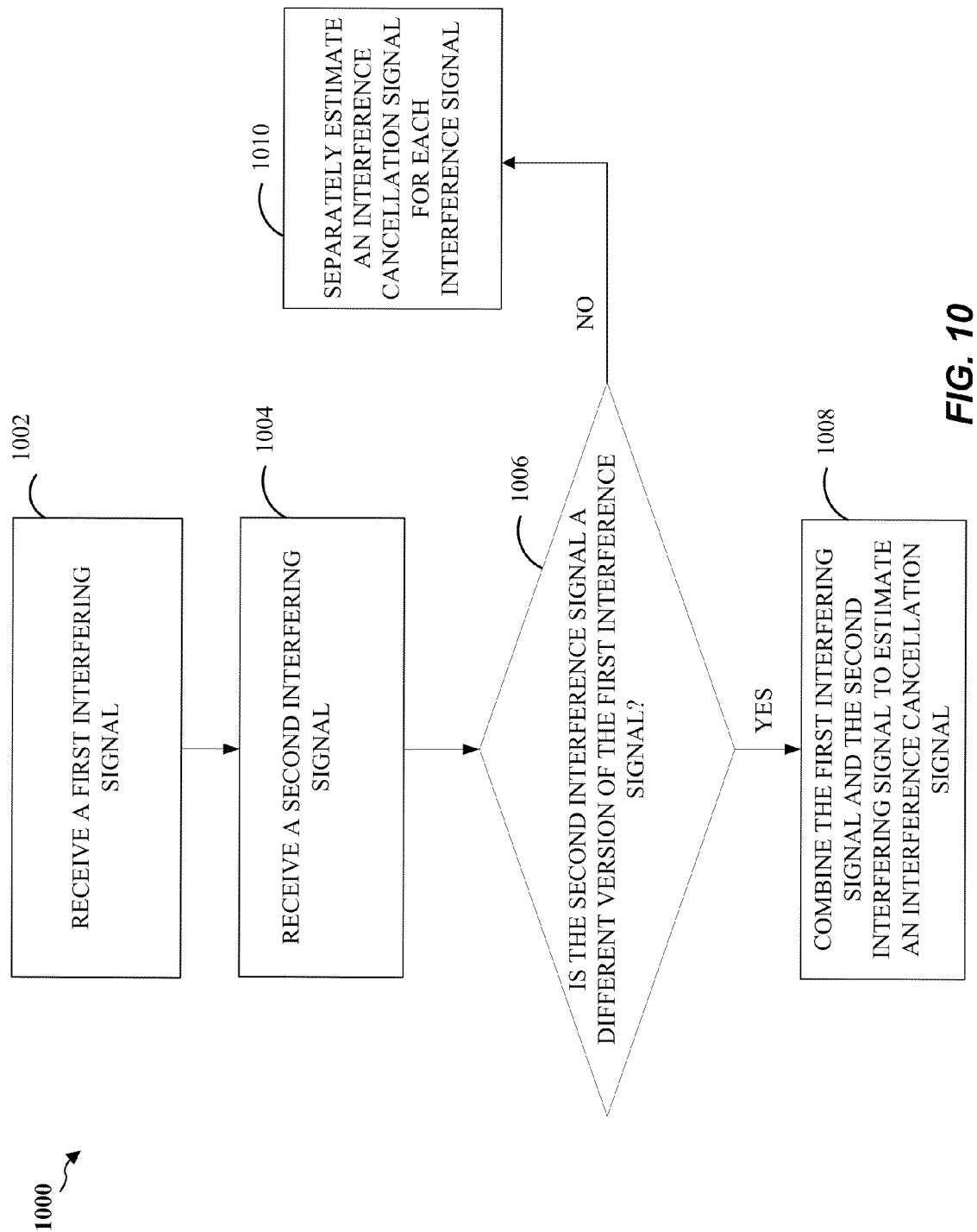
FIG. 10 is a block diagram illustrating a method for controlling combining of different versions of interference signals for interference cancellation according to an aspect of the present disclosure.

FIG. 10 illustrates a method 1000 for combining different versions of interference signals for interference cancellation. In block 1002, a wireless receiver receives a first interference signal. The wireless receiver receives a second interference signal in block 1004. Furthermore, in block 1006, the wireless receiver determines whether the second interference signal is a different version of the first interference signal. If the second interference signal is a different version of the first interference signal, in block 1008, the wireless receiver combines the first interference signal and the second interference signal to estimate at least one interference cancellation signal. If the second interference signal is not a different version of the first interference signal, in block 1010, an interference cancellation signal is estimated for each interference signal. That is, one interference cancellation signal is estimated based on the first interference signal and another interference cancellation signal is estimated based on the second interference signal. In one configuration, the wireless receiver may be a UE, an eNodeB, or any other type of wireless receiver.

Figure 11:
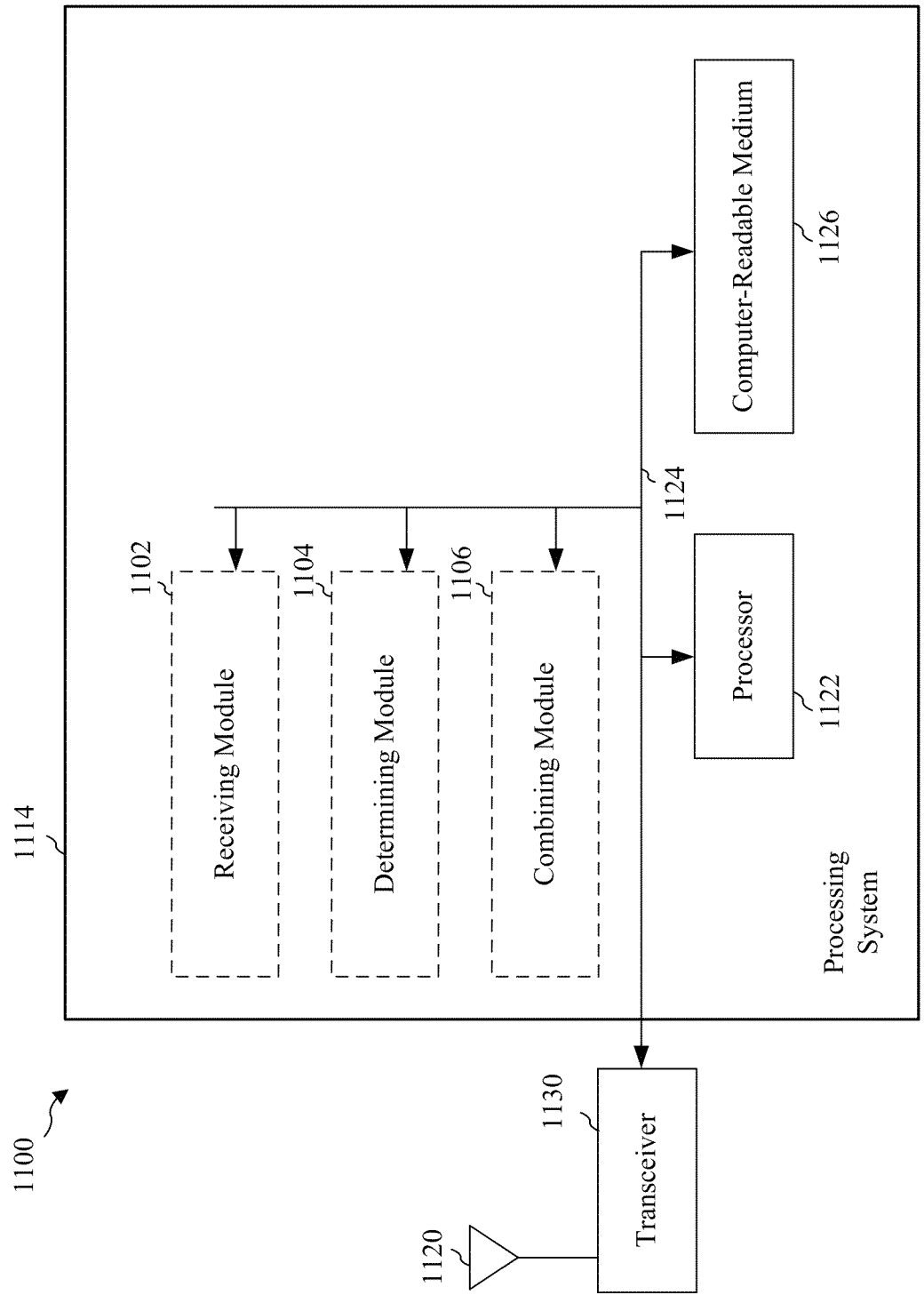
FIG. 11 is a block diagram illustrating different modules/means/components in an exemplary apparatus.

FIG. 11 is a diagram illustrating an example of a hardware implementation for an apparatus 1100 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122 the modules 1102, 1104, 1106 and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

The processing system 1114 includes a receiving module 1102 for receiving a first interference signal. The receiving module 1102 may also receive a second interference signal. In one configuration, separate receiving modules may receive each interference signal (not shown). The processing system 1114 also includes a version determining module 1104 for determining whether the second interference signal is a different version of the first interference signal. The processing system 1114 may further include a combining module 1106 for combining the first interference signal and the second interference signal to estimate at least one interference cancellation signal. The combining module 1106 combines the interference signals in response to the version determining module 1104 determining that the second interference signal is the different version of the first interference signal. The modules may be software modules running in the processor 1122, resident/stored in the computer-readable medium 1126, one or more hardware modules coupled to the processor 1122, or some combination thereof. The processing system 1114 may be a component of the UE 650 or eNodeB 610 and may include the memory 660 646, and/or the controller/processor 659 675.

In one configuration, the eNodeB 610 is configured for wireless communication including means for receiving. In one aspect of the present disclosure, the receiving means may be the receive processor 670, demodulators 618, controller/processor 675, memory 676, and/or antenna 620 configured to perform the functions recited by the receiving means. The eNodeB 610 is also configured to include a means for determining. In one aspect of the present disclosure, the determining means may be the controller/processor 675 and/or memory 676 configured to perform the functions recited by the determining means. The eNodeB 610 is also configured to include a means for combining. In one aspect of the present disclosure, the combining means may be the controller/processor 675 and/or memory 676 configured to perform the functions recited by the combining means. In another aspect of the present disclosure, the aforementioned means may be any module or any apparatus configured to perform the functions recited by the aforementioned means.

In one configuration, the UE 650 is configured for wireless communication including means for receiving. In one aspect of the present disclosure, the receiving means may be the receive processor 656, controller/processor 659, memory 660, modulators 654, and/or antenna 652 configured to perform the functions recited by the receiving means. The UE 650 may also be configured to include a determining means. In one aspect of the present disclosure, the determining means may be the controller/processor 659 and/or memory 660 configured to perform the functions recited by the determining means. The UE 650 may further be configured to include a combining means. In one aspect of the present disclosure, the combining means may be the controller/processor 659 and/or memory 660 configured to perform the functions recited by the combining means. In another aspect of the present disclosure, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a wireless device in a wireless communication system, comprising:
   receiving a first interference signal at a receiver;
   receiving a second interference signal at the receiver;
   determining whether the second interference signal and the first interference signal are different versions of a same interference signal; and
   combining the first interference signal and the second interference signal to estimate an interference cancellation signal when the second interference signal and the first interference signal are different versions of the same interference signal.

2. The method of claim 1, further comprising applying the estimated interference cancellation signal to an interference cancellation process.

3. The method of claim 1, further comprising:
   storing a first value associated with the first interference signal and a second value associated with the second interference signal in a buffer associated with the receiver when the second interference signal and the first interference signal are different versions of the same interference signal;
   in which the interference cancellation signal is based at least in part on a combination of the first value and the second value.

4. The method of claim 3, further comprising:
iteratively updating the stored first value and second value based at least in part on the interference cancellation signal; and
generating at least another interference cancellation signal based at least in part on the updated stored values.

5. The method of claim 3, further comprising:
selectively weighing the stored first value and second value proportionate to a signal-to-noise ratio of that interference signal during the generation of the interference cancellation signal.

6. The method of claim 1, further comprising selectively combining the first interference signal and the second interference signal to generate the interference cancellation signal based at least in part on an identified transmission diversity type, a signal quality of at least one received interference signal, a power budget, a time constraint, or a combination thereof.

7. The method of claim 1, further comprising:
receiving an indicator signal from a source of the first interference signal and the second interference signal; and
determining that the second interference signal and the first interference signal are different versions of the same interference signal based at least in part on the indicator signal.

8. The method of claim 1, in which the receiver is a User Equipment (UE) or a base station.

9. The method of claim 8, in which a source of the first interference signal is another base station or another UE.

10. The method of claim 1, further comprising:
receiving the first interference signal on a first channel; and
receiving the second interference signal on a second channel.

11. The method of claim 1, further comprising estimating another interference cancellation signal after receiving the first interference signal and prior to receiving the second interference signal.

12. The method of claim 1, further comprising:
determining whether a signal quality of the second interference signal is greater than or equal to a threshold,
in which:
the first interference signal and the second interference signal are combined when the signal quality is greater than or equal to the threshold; and
the first interference signal and a weighted second interference signal are combined when the signal quality is less than the threshold.

13. An apparatus for wireless communications, comprising:
a memory; and
at least one processor coupled to the memory, the at least one processor being configured:
to receive a first interference signal at a receiver;
to receive a second interference signal at the receiver;
to determine whether the second interference signal and the first interference signal are different versions of a same interference signal; and
to combine the first interference signal and the second interference signal to estimate an interference cancellation signal when the second interference signal and the first interference signal are different versions of the same interference signal.

14. The apparatus of claim 13, in which the at least one processor is further configured to apply the estimated interference cancellation signal to an interference cancellation process.

15. The apparatus of claim 13, in which the at least one processor is further configured to store a first value associated with the first interference signal and a second value associated with the second interference signal in a buffer associated with the receiver when the second interference signal and the first interference signal are different versions of the same interference signal;
in which the interference cancellation signal is based at least in part on a combination of the first value and the second value.

16. The apparatus of claim 15, in which the at least one processor is further configured:
to iteratively update the stored first value and second value based at least in part on the interference cancellation signal; and
to generate at least another interference cancellation signal based at least in part on the updated stored values.

17. The apparatus of claim 15, in which the at least one processor is further configured to selectively weigh the stored first value and second value proportionate to a signal-to-noise ratio of that interference signal during the generation of the interference cancellation signal.

18. The apparatus of claim 13, in which the at least one processor is further configured to selectively combine the first interference signal and the second interference signal to generate the interference cancellation signal based at least in part on an identified transmission diversity type, a signal quality of at least one received interference signal, a power budget, a time constraint, or a combination thereof.

19. The apparatus of claim 13, in which the at least one processor is further configured:
to receive an indicator signal from a source of the first interference signal and the second interference signal; and
to determine that the second interference signal and the first interference signal are different versions of the same interference signal based at least in part on the indicator signal.

20. The apparatus of claim 13, in which the receiver is a User Equipment (UE) or a base station.

21. The apparatus of claim 20, in which a source of the first interference signal is another base station or another UE.

22. The apparatus of claim 13, in which the at least one processor is further configured:
to receive the first interference signal on a first channel; and
to receive the second interference signal on a second channel.

23. The apparatus of claim 13, in which the at least one processor is further configured to estimate another interference cancellation signal after receiving the first interference signal and prior to receiving the second interference signal.

24. The apparatus of claim 13, in which the at least one processor is further configured:
to determine whether a signal quality of the second interference signal is greater than or equal to a threshold,
in which:
the first interference signal and the second interference signal are combined when the signal quality is greater than or equal to the threshold; and
the first interference signal and a weighted second interference signal are combined when the signal quality is less than the threshold.

25. An apparatus for wireless communications, comprising:
means for receiving a first interference signal at a receiver;
means for receiving a second interference signal at the receiver;

means for determining whether the second interference signal and the first interference signal are different versions of a same interference signal; and means for combining the first interference signal and the second interference signal to estimate an interference cancellation signal when the second interference signal and the first interference signal are different versions of the same interference signal.

26. A computer program product for wireless communications, the computer program product comprising:

a non-transitory computer-readable medium having program code recorded thereon, the program code comprising:

program code to receive a first interference signal at a receiver;

program code to receive a second interference signal at the receiver;

program code to determine whether the second interference signal and the first interference signal are different versions of a same interference signal; and program code to combine the first interference signal and the second interference signal to estimate an interference cancellation signal when the second interference signal and the first interference signal are different versions of the same interference signal.

* * * * *